United States Patent
Zhou et al.

(10) Patent No.: US 6,879,757 B1
(45) Date of Patent: Apr. 12, 2005

(54) CONNECTION BETWEEN A WAVEGUIDE ARRAY AND A FIBER ARRAY

(75) Inventors: Yan Zhou, Pleasanton, CA (US); Shide Cheng, Pleasanton, CA (US); Seng-Tiong Ho, Wheeling, IL (US)

(73) Assignee: Phosistor Technologies, Inc., Wheeling, IL (US)

( * ) Notice: Subject to any disclaimer, the term of this patent is extended or adjusted under 35 U.S.C. 154(b) by 0 days.

(21) Appl. No.: 10/310,330

(22) Filed: Dec. 4, 2002

Related U.S. Application Data
(60) Provisional application No. 60/339,135, filed on Dec. 11, 2001.

(51) Int. Cl.[7] .................................................. G02B 6/30
(52) U.S. Cl. ............................ 385/49; 385/50; 385/52; 385/89; 385/14
(58) Field of Search ............................ 385/14, 49–52, 385/88–94, 71, 78, 83

(56) References Cited

U.S. PATENT DOCUMENTS

| | | |
|---|---|---|
| 3,994,559 A | 11/1976 | Crow |
| 4,466,696 A | 8/1984 | Carney |
| 4,639,074 A | 1/1987 | Murphy |
| 4,930,854 A | 6/1990 | Albares et al. |
| 5,046,808 A | 9/1991 | Chang |
| 5,155,786 A | 10/1992 | Ecker et al. |
| 5,259,049 A | 11/1993 | Bona et al. |
| 5,337,398 A | 8/1994 | Bensoni et al. |
| 5,357,593 A | 10/1994 | Bossler |
| 5,444,805 A | 8/1995 | Mayer |
| 5,499,309 A | 3/1996 | Kozuka et al. |
| 5,552,092 A | 9/1996 | Francis et al. |
| 5,787,214 A | 7/1998 | Harpin et al. |
| 5,881,190 A | 3/1999 | Harpin et al. |
| 5,907,649 A | 5/1999 | Acklin et al. |
| 5,937,124 A | 8/1999 | Roff |
| 6,112,001 A | 8/2000 | Kishida et al. |
| 6,257,770 B1 * | 7/2001 | Sato .............................. 385/78 |
| 2003/0007746 A1 * | 1/2003 | Ryu et al. ...................... 385/88 |
| 2003/0215187 A1 * | 11/2003 | Tidmarsh et al. ............. 385/49 |

OTHER PUBLICATIONS

Boyd et al., "Optical coupling from fibers to channel waveguides formed on silicon", Applied Optics 17:6:895–898 (1978).

Jang, "Automation Manufacturing Systems Technology for Opto–electronic Device Packaging", 2000 Electronic Components and Technology Conference: 10–14 (2000).

Mueller et al., "Automated Fiber Attachment for 980nm Pump Modules", 2000 Electronic Components and Technology Conference: 5–9 (2000).

Kurate, "Mass Production Techniques for Optical Modules", 1998 Electronic Components and Technology Conference: 572–580 (1998).

Dautartas et al., "Hybrid Optical Packaging, Challenges and Opportunities", *2002 Electronic Components and Technology Conference*: 787–793 (2002).

* cited by examiner

*Primary Examiner*—Hemang Sanghavi
(74) *Attorney, Agent, or Firm*—Brinks Hofer Gilson & Lione

(57) ABSTRACT

In a connection between an optical fiber or optical fiber array and an integrated optical waveguide or integrated optical waveguide array mounted or fabricated on a grooved substrate, an end face of an optical fiber array has a first facet and a second facet. The first facet has an inclination angle substantially equal to the inclination angle of an end wall of the substrate groove; the second facet has an inclination angle substantially equal to the inclination angle of the end face of the integrated optical waveguide. When the optical fiber array is mounted on the grooved substrate, each of the fibers rests in one of the substrate grooves. The first facet of each optical fiber end face is aligned with the end wall of the groove in which it rests, and the second facet is aligned with the end face of the integrated optical waveguide.

14 Claims, 4 Drawing Sheets

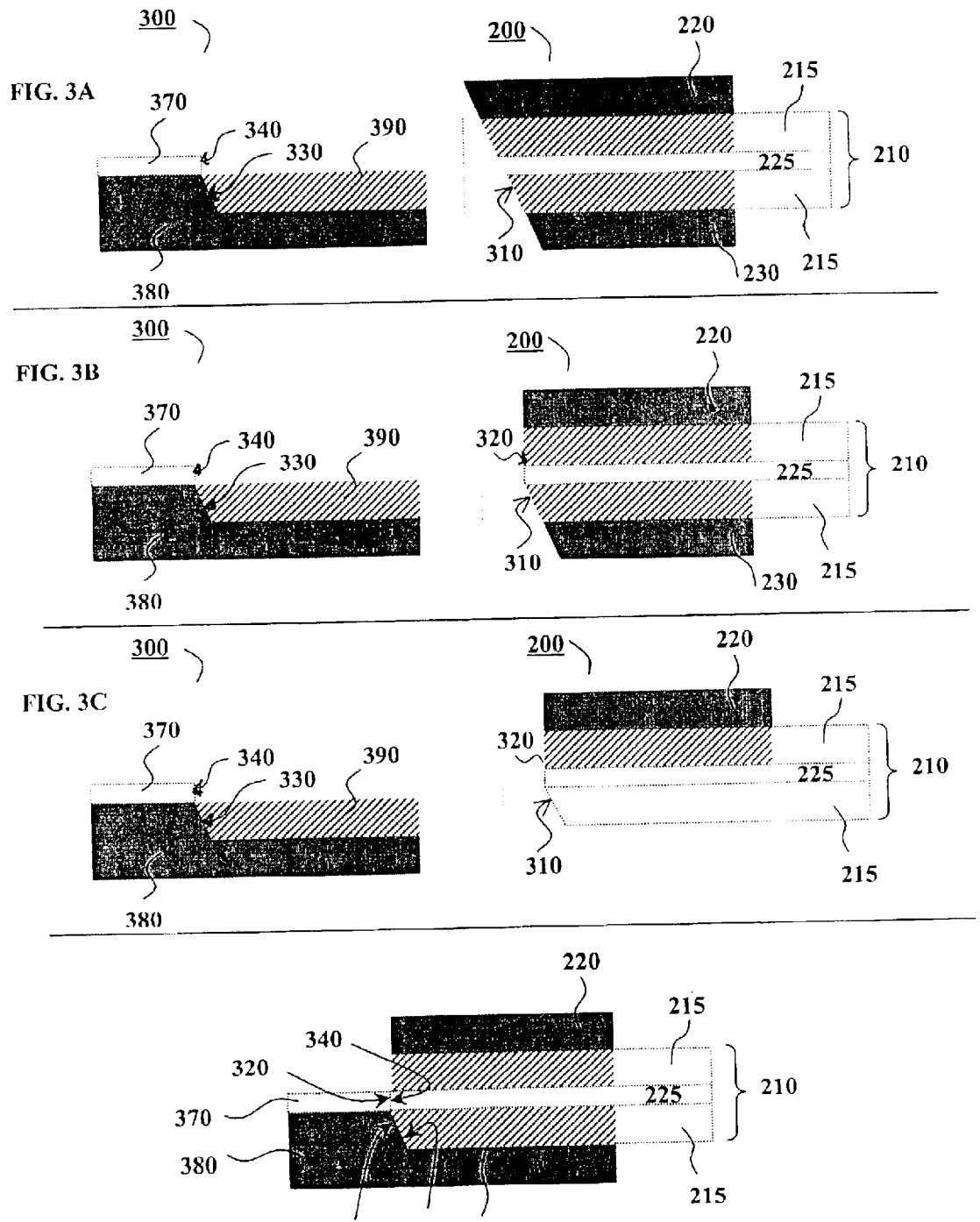

CONNECTION BETWEEN A WAVEGUIDE ARRAY AND A FIBER ARRAY

CROSS-REFERENCES TO RELATED APPLICATIONS

This application claims the benefit of U.S. Provisional Application No. 60/339,135, filed Dec. 11, 2001, entitled "Connection Between a Waveguide Array and a Fiber Array," which disclosure is incorporated herein by reference by all purposes.

This application is related to commonly assigned co-pending U.S. patent application Ser. No. 10/083,674, entitled "Integrated Planar Composite Coupling Structures for Bi-directional Light Beam Transformation Between a Small Mode Size Waveguide and a Large Mode Size Waveguide," filed Oct. 22, 2001, in the names of Yan Zhou and Seng-Tiong Ho, the disclosure of which is hereby incorporated by reference for all purposes.

This application is also related to commonly assigned U.S. patent application Ser. No. 10/310,604, entitled "Photonic Chip Mounting in a Recess for Waveguide Alignment and Connection," filed concurrently herewith in the names of Yan Zhou and Seng-Tiong Ho, the disclosure of which is hereby incorporated by reference for all purposes.

BACKGROUND OF THE INVENTION

The invention relates generally to fiber optic communications and in particular to systems and methods for coupling optical fibers to integrated optical waveguides.

As fiber-optic communication advances to handling larger bandwidth, photonic integrated circuits or chips are expected to replace many of the discrete optical components that are currently used to construct optical communication systems. In systems combining optical fibers and photonic integrated circuits, light must be efficiently coupled between optical fibers and integrated optical channel waveguides. A practical coupling setup must be reliable, efficient, and capable of mass production at low per-unit cost.

Existing techniques for fixing an optical fiber (and lens) in position with respect to a channel waveguide include epoxy curing, soldering, mechanical fixture, and laser welding. In order to reduce the need for manual picking and placing/aligning of components in the packaging process, efforts have been focused on automating the process. For example, Newport, JDS-Uniphase and NEC are investing in the development of automatic parts-handling and assembly procedures using machine vision combined with micro-stages or micro-robots to achieve sub-micron precision [e.g., Soon Jang, "Automation manufacturing systems technology for opto-electronic device packaging," 50th Electronic Components and Technology Conference, May 21–24, 2000, Las Vegas, Nev. USA; Peter Mueller and Bernd Valk, "Automated fiber attachment for 980 nm pump module," 50th Electronic Components and Technology Conference, May 21–24, 2000, Las Vegas, Nev. USA; Kazuhiko Kurata, "Mass production techniques for optical modules," 48th Electronic Components and Technology Conference, May 27–28, 1998, Seattle, Wash. USA].

In addition, silicon (Si) optical benches have become widely used. Such optical benches typically comprise a silicon substrate on which one or more grooves having a V-shaped or a U-shaped cross-section are wet-etched to guide the mounting or placement of photonic components including fibers, lenses and semiconductor chips [e.g., Murphy, "Fiber-waveguide self alignment coupler," U.S. Pat. No. 4,639,074, issued Jan. 27, 1987; Albares et al., "Optical fiber-to-channel waveguide coupler," U.S. Pat. No. 4,930,854, issued Jun. 5, 1990; Benzoni et al., "Single in-line optical package," U.S. Pat. No. 5,337,398, issued Aug. 9, 1994; Francis et al., "Waveguide coupler," U.S. Pat. No. 5,552,092, issued Sep. 3, 1996; Harpin et al., "Assembly of an optical component and an optical waveguide," U.S. Pat. No. 5,881,190, issued Mar. 9, 1999; Roff, "Package for an optoelectronic device," U.S. Pat. No. 5,937,124, issued Aug. 10, 1999]. FIG. 1A shows an end view of a prior art V-groove alignment system for an optical fiber. Silicon substrate 140 has a V-groove 110 etched therein, in which optical fiber 120 rests. Channel waveguides may be mounted on substrate 140 using high precision automated alignment technology. Alternatively, as shown in FIG. 1B, a separate alignment step may be avoided by fabricating an integrated optical waveguide 130 and a properly aligned V-groove 110 on the same silicon substrate 140. Alignment between an optical fiber 120 and waveguide 130 is then achieved passively, by placing fiber 120 in V-groove 110.

Typically, V-groove 110 is formed by wet etching of substrate 140. As a consequence of the wet etching process, the end wall 150 of V-groove 110 is not vertical; it is inclined, as shown in FIG. 1B. When a cleaved optical fiber 120 with a substantially vertical flat end face 160 is placed in V-groove 110, end face 160 cannot make good contact with inclined end wall 150 of the V-groove and may not be able to make contact with the end face 170 of an integrated optical waveguide 130 fabricated or mounted flush with the top edge of end wall 150. If the distance between waveguide end face 170 and fiber end face 160 is large compared to the wavelength of transmitted light, then light is inefficiently coupled between the fiber and the waveguide. Thus, integrated optical waveguide 130 is typically positioned so that a substantial length of waveguide material protrudes into or overhangs V-groove 110, as indicated by dotted portion 137, thereby enabling end face 160 of fiber 120 to make contact with a protruded end face 131 of integrated optical waveguide 130.

However, in the structure of FIG. 1B, the protruding portion 137 of integrated optical channel waveguide 130 (and possibly its lower cladding layer 135, which may also act as a mechanical support) is vulnerable to damage when fiber 120 is placed in V-groove 110 and pushed into contact with waveguide end face 131. To protect waveguide 130, various mechanical stops as well as larger supporting and protecting structures have been used. These stops and structures may enhance the mechanical strength of the overhanging portion of the waveguide, prevent damaging contact with optical fibers, or provide a small gap between the waveguide and the fiber [e.g., Harpin et al., "Connection between an integrated optical waveguide and an optical fiber," U.S. Pat. No. 5,787,214, issued Jul. 28, 1998]. In general, however, the addition of such stops and structures complicates the fabrication of the waveguide and the positioning and alignment of the optical fiber.

Another alternative is to create a vertical end wall for the V-groove using, for instance, a diamond saw-cut or ultrasonic grinding of the substrate [e.g., Bossler, "Method of attaching optical fibers to opto-electronic integrated circuits on silicon substrates," U.S. Pat. No. 5,357,593, Oct. 18, 1994]. But because this approach is very time-consuming, it is not practical for applications involving a large number of V-grooves on a single wafer or mass production of V-grooved wafers.

An improved method of providing a connection between an optical fiber and an integrated optical waveguide is therefore needed.

BRIEF SUMMARY OF THE INVENTION

The present invention provides an improved connection between an optical fiber or optical fiber array and an integrated optical waveguide or integrated optical waveguide array mounted or fabricated on a grooved substrate. According to an aspect of the present invention, an end face of an optical fiber array is shaped to have a first facet and a second facet. The first facet has an inclination angle that is substantially equal to the inclination angle of an end wall of the substrate groove, and the second facet has an inclination angle that is substantially equal to the inclination angle of the end face of the integrated optical waveguide. When the optical fiber array is mounted on the grooved substrate, each of the fibers rests in one of the substrate grooves. The first facet of each optical fiber end face is in close proximity to or actual contact with the end wall of the groove in which it rests, and the second facet is in close proximity to or actual contact with the end face of the integrated optical waveguide.

According to a further aspect of the present invention, the optical fiber array may be fabricated by permanently fixing a portion of the axial surface of each of a number of optical fibers to a first block, then removably fixing another portion of the axial surface of each fiber to a second block oriented substantially parallel to the first block. After shaping of the first and second facets in the end face of the array, the second block is removed. The blocks may comprise silicon or other materials. A solvent-dissolvable material may be used for removably fixing the second block, and the second block may be removed by application of the corresponding solvent.

According to another aspect of the present invention, the end face of the fiber array may be shaped by performing a first and a second lapping and polishing process.

According to yet another aspect of the present invention, the optical fiber array may be mounted on the substrate so that the second facet is in contact with the end face of the integrated optical waveguide. Alternatively, a gap may be present between the respective end faces. If present, the gap may be filled with an index matching material. The index-matching material may also serve as a permanent bonding material for permanently bonding the fiber array to the optical waveguide array.

According to yet another aspect of the present invention, a coupling structure for an integrated optical waveguide and an optical fiber is provided. An integrated optical waveguide module comprises one or more integrated optical waveguides upon a substrate. The substrate has one or more grooves therein, each aligned with a respective one of the integrated optical waveguides. An optical fiber array comprises one or more optical fibers mounted on a grooved chip, and having an end face shaped to have a first facet and a second facet. The first facet comprises an end face of a first portion of the fiber cladding and has a first facet inclination angle substantially equal to the end wall inclination angle. The second facet comprises an end face of the fiber core and has a second facet inclination angle substantially equal to the waveguide end face inclination angle. The optical fiber array is mounted on the integrated optical waveguide module so that each fiber rests in one of the substrate grooves, with the first facet of each of the one or more optical fibers aligned with the end wall of one of the substrate grooves and the second facet of each of the one or more optical fibers aligned with the end face of one of the integrated optical waveguides.

According to a further aspect of the present invention, the coupling structure may also include an index matching material disposed between the second facet of each of the one or more optical fibers and the respective end face of the corresponding one of the one or more integrated optical waveguides.

According to a still further aspect of the present invention, the substrate may comprises a silicon substrate, and the chip may comprise a silicon chip.

The following detailed description together with the accompanying drawings will provide a better understanding of the nature and advantages of the present invention.

BRIEF DESCRIPTION OF THE DRAWINGS

FIGS. 3A–D are side views showing various stages in mounting a fiber array on a V-grooved substrate according to an embodiment of the present invention.

DESCRIPTION OF THE SPECIFIC EMBODIMENTS

Figure 1A:
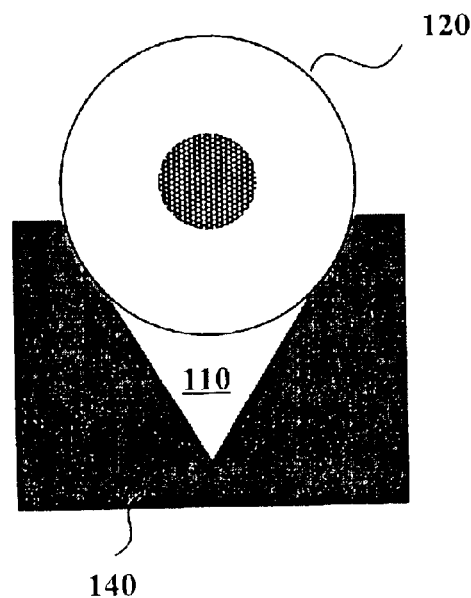
FIG. 1A is an end view of a prior art apparatus for mounting an optical fiber on a silicon substrate.
Figure 1B:
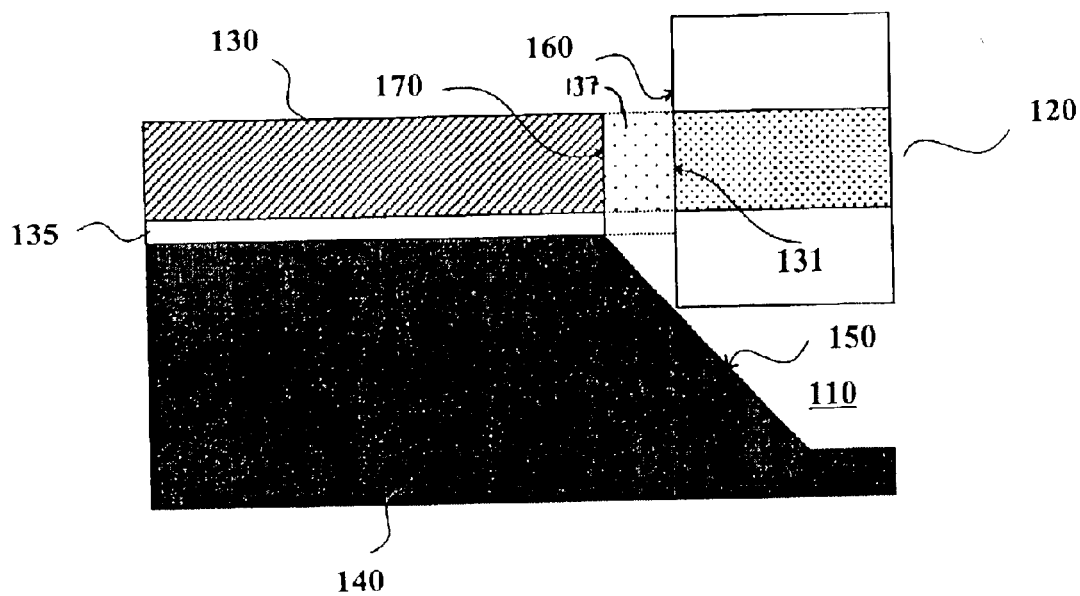
FIG. 1B is a longitudinal cross section (side) view of a prior art apparatus for coupling an optical fiber to an integrated optical waveguide.
Figure 2A:
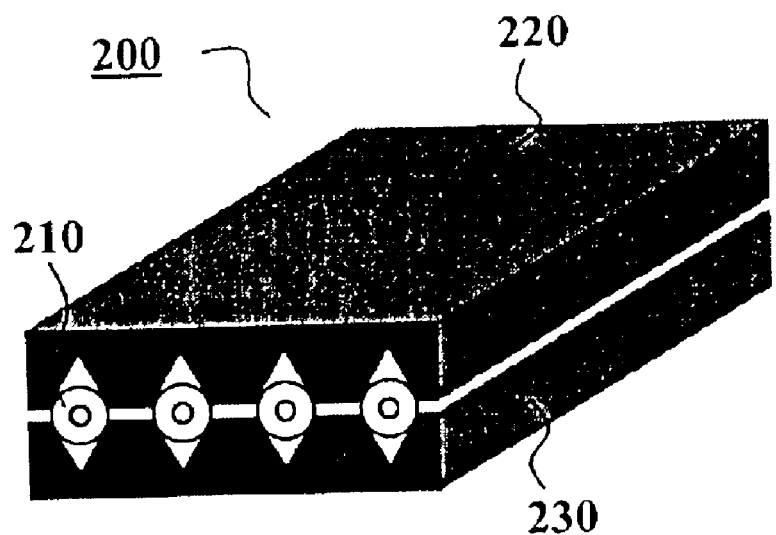
FIGS. 2A–B are a perspective view and a side view, respectively, of a fiber array sandwiched between two V-grooved chips according to an embodiment of the present invention.
Figure 2B:
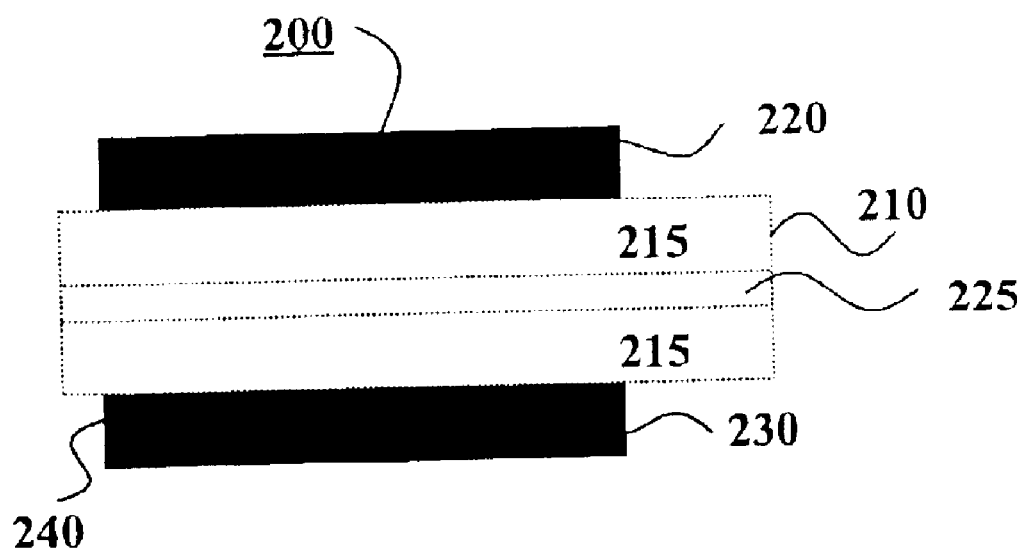

FIGS. 2A and 2B show a three-dimensional view and a side view, respectively, of an exemplary embodiment of a fiber array 200. Fiber array 200 comprises first and second grooved chips 220, 230, which may be made from silicon or other material using any suitable fabrication technology, such as wet etching. Depending on the diameter of the fiber and the desired height of the fiber central axis relative to the chip surface (for instance, 5 $\mu$m above the surface), etching parameters for fabricating the grooves may be selected, as is well known in the art. The grooves may be V-grooves as shown, or they may have a U-shaped or other cross section suitable for holding optical fibers in position. One or more optical fibers 210 are sandwiched between first and second chips 220 and 230. The spacing of the fibers in a multi-fiber array is controlled by the spacing of the grooves, which may be selected as desired. The grooved surface of the first chip 220 is treated so as to bond fibers 210 permanently to the surface, for instance, by applying a solvent non-dissolvable bonding material. The bonding between fibers 210 and the second chip 230 is non-permanent so that chip 230 may later be detached from the fiber array; wax or other solvent-dissolvable materials may be used as removable bonding agents.

The left half of each of FIGS. 3A–C shows a side view of an integrated optical waveguide array 300 comprising one or more integrated optical waveguides 370 that have been fabricated or mounted on a silicon substrate 380. Substrate 380 has one or more wet-etched grooves 390, each of which has an inclined end wall 330. Again, these grooves may be V-grooves as shown, or they may have a U-shaped or other cross section suitable for holding optical fibers in position. Each optical waveguide 370 has an end face 340 for coupling to an optical fiber. A variety of techniques for fabricating integrated optical waveguides and grooves on silicon substrates are known in the art, and waveguide array 300 may be fabricated using any suitable technique.

Integrated optical waveguide 370 may comprise any optical waveguiding and/or beam-reshaping structure, including a micro-optic structure such as a micro-optical lens, mirror, or diffractive element. Waveguide 370 may also be a combined waveguiding and beam transformation structure, such as a coupler of the type described in the above-cross-referenced co-pending U.S. patent application Ser. No. 10/083,674. Waveguide 370 may be fabricated using any suitable methods and materials, including glass, semiconductors, polymers, optical crystals, or other dielectric materials.

To couple fiber array 200 to waveguide array 300, the end face of fiber array 200 is reshaped to match the end face of optical waveguide array 300. First, as shown in the right half of FIG. 3A, the end face of fiber array 200 is shaped—preferably by lapping and polishing—so that end faces 310 of fibers 210 have the same inclination angle as groove end wall 330. Although FIG. 3A shows the end faces of fiber-holding chips 220, 230 having the same inclination angle as fiber end faces 310, this is not required; however, it will be appreciated that most techniques for shaping end faces of fiber arrays will shape the end faces of the chips (or other holding structures) as well.

A second shaping step is then performed, as shown in the right half of FIG. 3B, to create a flat end surface 320 for the fiber core 225 and an upper section of the fiber cladding 215, resulting in the end face of fiber array 200 having facets 310, 320. Facet 320 may be normal to the fiber axis as shown; alternatively, if end face 340 of integrated optical waveguide 370 is not normal to the substrate surface, then facet 320 may be shaped at an angle that corresponds to the inclination angle of end face 340. Preferably, lapping and polishing is also used for this step.

The second fiber-holding chip 230 is then removed, as shown in FIG. 3C, for instance by applying a solvent to dissolve the bonding material. Fiber array 200, together with the permanently bonded fiber-holding chip 220 is then mounted on substrate 380 with fiber 210 resting in groove 390, as shown in FIG. 3D.

In the fiber-shaping process, the removal of material during the second shaping step is precisely controlled so that when facet 310 is placed into contact with groove end wall 330, facet 320 (which includes the end face of fiber core 225) is either in close proximity to or in actual contact with end face 340 of integrated optical waveguide 370, thereby providing efficient coupling of light between fiber core 225 and integrated optical waveguide 370. For example, standard lapping and polishing machines are able to control material removal with a precision of about 1 $\mu$m, which is sufficient precision for the second shaping step. Other shaping processes providing comparable precision may also be used.

Figure 4:
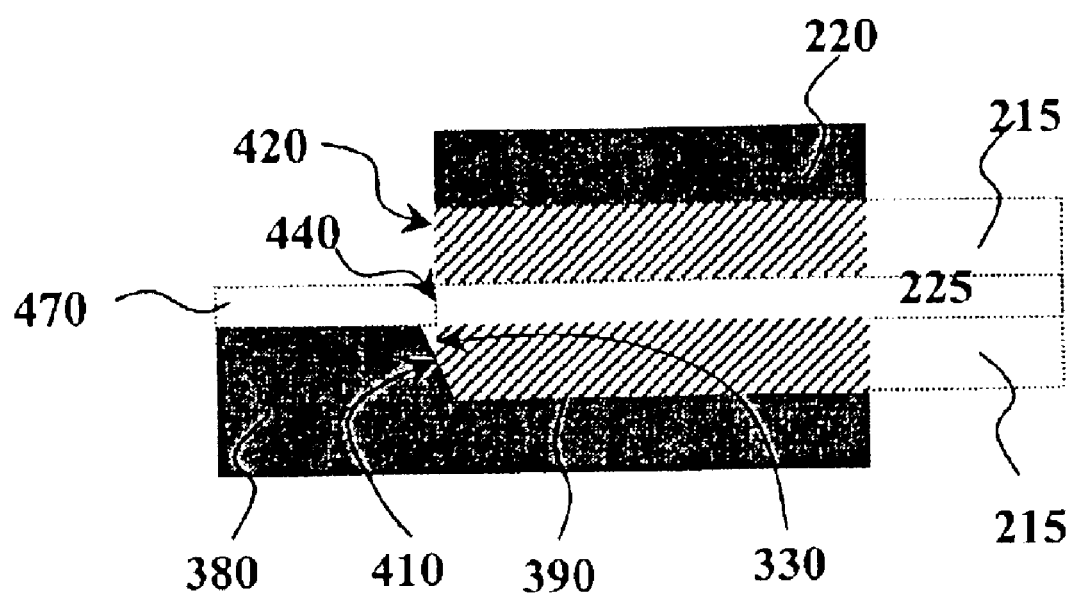
FIG. 4 is a side view of an alternative embodiment of a fiber array mounted on a V-grooved substrate according to the present invention.

Because the removal of material is controlled, a fiber array may be fabricated in a similar manner for use with an integrated optical channel waveguide 470 that slightly protrudes into or overhangs groove 390, as shown in FIG. 4. In this embodiment, the second shaping step has been modified to provide a smaller facet 410 matching the inclination angle of groove end wall 330 and a larger facet 420 matching the inclination angle of end face 440 of waveguide 470. As a result, faceted fiber end face 410, 420 makes contact simultaneously with both groove end wall 330 and end face 440 of channel waveguide 470. This configuration is useful, for example, in implementations where the groove is wet etched using the channel waveguide as an etch mask, thereby causing the channel waveguide to slightly overhang the groove.

In some embodiments, it may be desirable to leave a small gap between the respective end faces of fiber core 225 and integrated optical waveguide 370 (or 470), for instance, in order to prevent damage to either end face during mounting of fiber array 200. In other embodiments, contact between the respective end faces of the fiber core and channel waveguide may be imperfect. For instance, there may be irregularities in the end face surfaces that cause imperfect contact. To improve the efficiency of light coupling, a refractive-index-matching material is preferably applied to the end faces of the waveguide and/or the fiber prior to or after mounting of the fiber array in the substrate grooves. Many such materials are known in the art, including silicone gel, various transparent oils, and thermally curable or UV-curable epoxies. Use of an index-matching material provides improved transmission efficiency in the presence of gaps between the fiber and waveguide end faces or irregularities in either surface. In addition, an index-matching material substantially reduces Fresnel reflection at the optical interfaces. A number of known index-matching materials also act as bonding agents. Such a dual-purpose material may be used if it is desired to permanently bond the fiber array block to the integrated optical channel waveguide module.

While the invention has been described with respect to exemplary embodiments, one skilled in the art will recognize that numerous modifications are possible. For instance, the fiber-holding grooves, although shown with a V-shaped cross section, may instead have U-shaped or other cross sections suited to holding an optical fiber. Also, instead of using two grooved chips for fixing the fibers in an array, a top grooved chip and a flat bottom piece made of silicon, glass or any other solid material may also be used. Likewise, one skilled in the art will also recognize that the grooved substrate used for positioning of the fibers in an array may be made of any type of material, including silicon, glass, quartz, gallium arsenide (GaAs), indium phosphide (InP), gallium nitride (GaN), lithium niobate (LiNbO$_3$), barium titanate (BaTiO$_3$), and sapphire (Al$_2$O$_3$). Similarly, the integrated optical waveguide(s) may be fabricated or mounted on any of these or other substrate materials.

The exemplary process also used lapping and polishing to shape the end face of the fiber array; however, any end-face shaping process that provides the requisite degree of control over material removal may be used. Such processes include precision sawing, cutting and laser ablation.

It will also be appreciated that the invention may be applied to arrays comprising any number of fibers or integrated optical waveguides, ranging from a single fiber-waveguide coupling to an arbitrary number of such couplings. In addition, the spacing of optical fibers and integrated optical waveguides in an array may be varied.

Thus, although the invention has been described with reference to a specific embodiment, it will be appreciated that the invention is intended to cover all modifications and equivalents within the scope of the appended claims.

What is claimed is:

1. A method for coupling an optical fiber array comprising one or more optical fibers and an integrated optical waveguide array comprising one or more integrated optical waveguides upon a substrate having one or more fiber-mounting grooves therein, the method comprising:

shaping an end face of the optical fiber array to have a first facet and a second facet,
        wherein the first facet has a first inclination angle substantially equal to an end wall inclination angle of an end wall of one of the one or more fiber-mounting grooves, and wherein the second facet has a second inclination angle substantially equal to a waveguide inclination angle of an end face of one of the one or more integrated optical waveguides; and mounting the optical fiber array on the substrate so that each of the one or more fibers rests in a respective one of the one or more fiber-mounting grooves, the first facet of each of the one or more fibers being aligned with the end wall of the respective one of the one or more grooves and the second facet of each of the one or more fibers being aligned with the end face of the respective one of the one or more integrated optical waveguides.

2. The method of claim 1, further comprising:

before the step of shaping the end face of the optical fiber array:

permanently fixing a first portion of an axial surface of each of one or more optical fibers to a first block, thereby forming an optical fiber array; and removably fixing a second portion of the axial surface of each of the one or more optical fibers to a second block, the second block being oriented substantially axially opposite the first block; and after the step of shaping the end face of the optical fiber array, removing the second block from the optical fiber array.

3. The method of claim 2, wherein the step of permanently fixing a first portion of an axial surface of each of one or more optical fibers to a first block comprises:

obtaining a first silicon chip with one or more chip grooves therein; and permanently fixing one optical fiber in each of the one or more chip grooves.

4. The method of claim 3, wherein the step of removably fixing a second portion of the axial surface of each of the one or more optical fibers to a second block comprises:

obtaining a second silicon chip having one or more grooves therein, each of the grooves corresponding to a respective groove of the first silicon chip;

aligning the second silicon chip so that each optical fiber rests in one of the one or more grooves of the second silicon chip; and removably fixing the second silicon chip in position.

5. The method of claim 2, wherein:

the step of removably fixing a second portion of the axial surface of each of the one or more optical fibers to a second block comprises using a solvent-dissolvable material; and the step of removing the second block from the optical fiber array comprises applying a solvent to dissolve the solvent-dissolvable material.

6. The method of claim 1, wherein the stop of mounting the optical fiber array on the waveguide array comprises:

positioning the optical fiber array so that the second facet of each of the one or more fibers contacts the end face of the respective one of the one or more integrated optical waveguides.

7. The method of claim 1, wherein the step of mounting the optical fiber array on the waveguide array comprises:

positioning the optical fiber array so that a gap is present between the second facet of each of the one or more fibers and the end face of the respective one of the one or more integrated optical waveguides.

8. The method of claim 1, further comprising:

applying a refractive index matching material between the second facet of each of the one or more optical fibers and the end face of the respective one or more integrated optical waveguides.

9. The method of claim 8, further comprising:

selecting a refractive index matching material that is also a permanent bonding material for permanently bonding the fiber array to the waveguide array.

10. The method of claim 1, wherein the step of shaping an end face of the optical fiber array to have a first facet and a second facet comprises:

performing a first lapping and polishing of the end face of the optical fiber array, wherein the end face of the optical fiber array is shaped to have the first inclination angle; and performing a second lapping and polishing of the end face of the optical fiber array, wherein a portion of the end face of the optical fiber array is reshaped to have the second inclination angle.

11. A coupling structure for an integrated optical waveguide and an optical fiber comprising:

an integrated optical waveguide module, comprising:

a substrate having one or more substrate grooves therein, each of the one or more substrate grooves having an end wall with an end wall inclination angle; and one or more integrated optical waveguides disposed on the substrate, each of the one or more integrated optical waveguides having an end face with a waveguide inclination angle, the end face being aligned with a respective one of the one or more substrate grooves; and an optical fiber array comprising:

a chip having one or more chip grooves therein, the number of chip grooves being equal to the number of substrate grooves; and one or more optical fibers, each of the one or more optical fibers being fixed in a respective one of the one or more chip grooves and having a fiber core and a fiber cladding;

wherein the end face of each of the one or more optical fibers has a first facet and a second facet, the first facet comprising an end face of a first portion of the fiber cladding and having a first facet inclination angle substantially equal to the end wall inclination angle, the second facet comprising an end face of the fiber core and having a second facet inclination angle substantially equal to the waveguide inclination angle;

wherein the optical fiber array is mounted on the substrate of the integrated optical waveguide module so that each of the one or more optical fibers rests in a respective one of the one or more substrate grooves, the first facet of each of the one or more optical fibers being aligned with the end wall of the respective one of the one or more substrate grooves, and the second facet of each of the one or more optical fibers aligned with the end face of the respective one of the one or more integrated optical waveguides.

12. The coupling structure of claim 11, further comprising a refractive index matching material disposed between the second facet of each of the one or more optical fibers and the respective end face of the corresponding one of the one or more integrated optical waveguides.

13. The coupling structure of claim 11, wherein the substrate comprises a silicon substrate.

14. The coupling structure of claim 11, wherein the chip comprises a silicon chip.

* * * * *